United States Patent
Christ, Jr. et al.

(10) Patent No.: US 7,770,276 B2
(45) Date of Patent: Aug. 10, 2010

(54) DEVICE AND METHOD FOR SEQUENTIALLY COLD WORKING AND REAMING A HOLE

(75) Inventors: Robert J. Christ, Jr., Brentwood, NY (US); Jerrell A. Nardiello, Hicksville, NY (US); John M. Papazian, Great Neck, NY (US); John Steven Madsen, Commack, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 949 days.

(21) Appl. No.: 11/510,156

(22) Filed: Aug. 25, 2006

(65) Prior Publication Data

US 2008/0047320 A1    Feb. 28, 2008

(51) Int. Cl.
*B24B 39/00* (2006.01)
*B23B 51/00* (2006.01)

(52) U.S. Cl. .................... 29/90.01; 72/324; 72/325; 408/22

(58) Field of Classification Search ............. 408/22–30; 29/90.01; 72/324, 325, 327
See application file for complete search history.

(56) References Cited

U.S. PATENT DOCUMENTS

| | | | | |
|---|---|---|---|---|
| 2,923,181 A | * | 2/1960 | Grage | 29/90.01 |
| 4,054,976 A | * | 10/1977 | Ewald et al. | 29/90.01 |
| 4,091,525 A | * | 5/1978 | Karasiewicz et al. | 29/90.01 |
| 4,133,089 A | * | 1/1979 | Heymanns | 29/90.01 |
| 5,125,772 A | * | 6/1992 | Kress | 408/56 |
| 5,201,616 A | * | 4/1993 | Alverio | 408/224 |
| 5,921,727 A | * | 7/1999 | Depperman | 408/144 |
| 6,560,835 B2 | * | 5/2003 | Porter et al. | 29/90.01 |

OTHER PUBLICATIONS

Fatigue Technology Inc., Split Sleeve Cold Expansion, www.fatiguetech.com.

* cited by examiner

*Primary Examiner*—David B Jones
(74) *Attorney, Agent, or Firm*—Stetina Brunda Garred & Brucker

(57) ABSTRACT

A device and a method are provided to allow a user to ream a hole to an accurate final diameter as desired, and at the same time, to cold work the hole to induce a beneficial residual stress that will enhance the life of the component by retarding the onset and growth of fatigue cracks in the hole. The basic design of the device has an elongated body having a forward end portion to extend through a hole to be reamed and cold worked, a reamer section formed on the circumference of the forward end portion to enlarge the hole, and a burnishing section formed on the circumference of the elongated body adjacent to the reamer. The burnishing section is operative to upset the material around the hole, so as to result in a residual stress beneficial to the hole. The reamer section is in the form of a plurality of cutting edges extending from a tip of the elongated body, while the burnishing section is also in the form of a plurality of cutting edges adjacent to the reamer section along the elongate body. The cutting edges of the reamer sections are parallel straight cutting edges or helical cutting edges. The cutting edges of the burnishing section are configured with an orientation opposite to that of the cutting edges of the reaming section. Therefore, when the cutting edges of the burnishing section are configured with the same profile as the cutting edges of the reamer section, the burnishing section is in the form of a backward reamer section.

13 Claims, 3 Drawing Sheets

REAMER

COLD WORKING REAMER

DEVICE AND METHOD FOR SEQUENTIALLY COLD WORKING AND REAMING A HOLE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates in general to a device and a method to ream a hole to an accurate final diameter and cold work the hole to induce a beneficial residual stress that will enhance the life of the component by retarding the onset and growth of fatigue cracks in the hole.

When a hole is drilled or bored through a metal and enlarged by a reamer, cold work is often applied to the hole to enhance its fatigue life. FIGS. 1A to 1D illustrate the steps required for a conventional cold work after a hole is initially drilled. As shown in FIG. 1A, after a hole 12 is drilled through a material 10, a tapered mandrel 14 pre-fitted with a lubricated split sleeve 16 is used to insert through the hole 12 in the material such as aluminum, steel, titanium or other metals. The function of the disposable split sleeve 16 is to reduce mandrel pull force, to ensure correct radial expansion of the hole, to preclude damage of the hole, and to allow one-sided processing. In FIG. 1B, the mandrel 14 pre-fitted with the sleeve 16 is then drawn through the hole 12. In FIG. 1C, the mandrel 14 is withdrawn from the hole 12, and in FIG. 1D, the sleeve 16 is removed and discarded from the hole 12, which is then reamed to the final size as shown.

The process as shown in FIG. 1A to FIG. 1D is time consuming and requires a skilled technician to accomplish. In the case that a large number of holes on a structure such as an aircraft, this method is only employed where it is absolutely necessary. It is therefore a substantial need to develop a cold working and reaming process and device that does not only reduce labor and time consumption, but also reduce the overall cost for treating a large number of holes.

BRIEF SUMMARY

A device and a method are provided to allow a user to ream a hole to an accurate final diameter as desired, and at the same time, to cold work the hole to induce a beneficial residual stress that will enhance the life of the component by retarding the onset and growth of fatigue cracks in the hole. The basic design of the device includes an elongate body having a forward end portion to extend through a hole to be reamed and cold worked, a reamer section formed on the circumference of the forward end portion to enlarge the hole, and a burnishing section formed on the circumference of the elongate body adjacent to the reamer. The elongate body is preferably in the form of a cylindrical body. The burnishing section is operative to upset the material around the hole, so as to result in a residual stress beneficial to the hole. Preferably, the distal end portion is tapered towards the forward end of the elongate body. The reamer section includes a plurality of cutting edges extending from a tip of the elongate body, while the burnishing section also includes a plurality of cutting edges adjacent to the reamer section along the elongate body. The cutting edges of the reamer sections are parallel straight cutting edges or helical cutting edges. The cutting edges of the burnishing section are configured with an orientation opposite to that of the cutting edges of the reaming section. Therefore, when the cutting edges of the burnishing section are configured with the same profile as the cutting edges of the reamer section, the burnishing section is in the form of a backward reamer section.

In the above embodiment, the reamer section is aligned with the tip of the forward end portion. Such that the reamer section is the first mechanism engaging the hole to enlarge the hole, and the enlarged hole is then cold worked by the burnisher section adjacent to the reamer section. In an alternate embodiment, the burnisher section is aligned with the tip of the forward end of the elongate body to operate as the first mechanism to engage the hole. Therefore, the material is subject to the cold work process prior to the reaming application applied thereto. In either way, an accurately sized diameter of the hole with a round cross section that is not distorted or oval as can be the case with twist drills can be achieved.

In yet another embodiment, the reamer mechanism and the cold work mechanism are combined with the drill member, such that a hole can be drilled, reamed, and cold worked with a single tool in a single step. In this embodiment, the tool includes an elongate body, preferably a cylindrical body, having a proximal end and a distal end. The proximal end is preferably operative to couple to a motor, such that the tool can be driven to spin in operation. The distal end of the elongate body includes a drill member, a reamer, and a burnisher adjacent to each other. When the elongate body is driven to advance towards a material, the drill member is operative to drill a hole through the material. The reamer is then advanced to engage the hole. The spinning operative of the elongate body allows the reamer to remove an additional amount of the material from the hole, so as to enlarge the hole to a desired size. By further forwarding the elongate body, the burnisher is advanced to engage the hole, so as to create a residual stress beneficial thereto.

Similar to the above, the positions of the reamer and the burnisher can be exchanged without affecting the reaming and cold working effect of the hole. In addition, the forward end of the elongated body is preferably tapered, such that as the forward end of the elongate body is advanced towards the hole, the cross sectional area engaging the hole becomes larger.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 2:
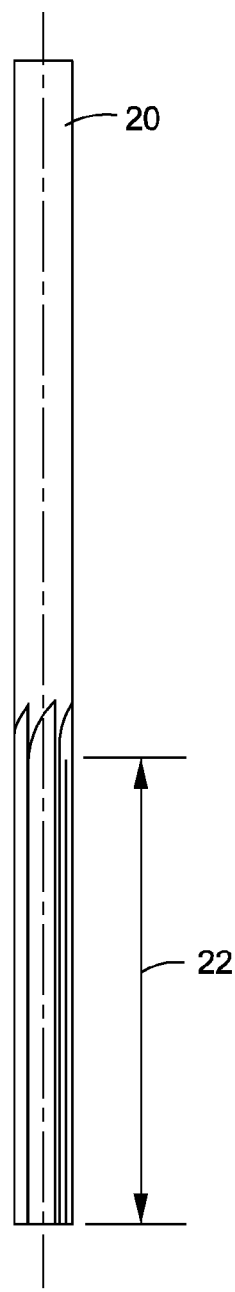
FIG. 2 is a side view and a cross sectional of a conventional reamer.

FIG. 2 illustrates the side view and cross view of a typical reamer. As shown, the reamer includes a cylindrical body 20 and a set of parallel straight cutting edges 22 formed at a forward end of the cylindrical body 20. As shown in the cross sectional view in FIG. 2, each of the cutting edges 22 is ground at a slight angle with a slight undercut below the cutting edge. As desired, the reamer must combine both hardness in the cutting edge for long life and toughness so that tool does not fail under the normal force of use. For each reaming process applied to a hole, only a small amount of material is expected to be removed by the reamer to ensure a long life of the reamer and a superior finish to the hole. Although FIG. 2 illustrates the parallel straight cutting edges 22 only, it would be appreciated that different arrangement, for example, helical arranged cutting edges 22 may also be formed at the forward end of the cylindrical body 20 to achieve specific reaming effect.

Figure 3:
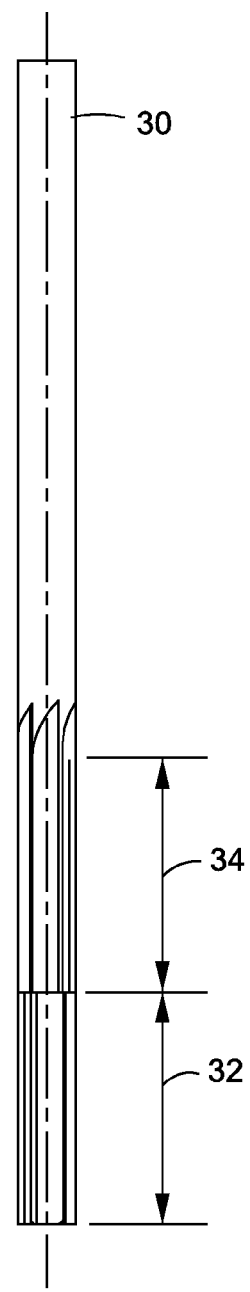
FIG. 3 shows a side view of a cold working reamer and the cross sectional views of both the reamer portion and the burnisher portion of the cold working reamer.

FIG. 3 illustrates a side view and a cross sectional view a cold working reamer with similar structure as the typical reamer as shown in FIG. 2. As shown, the cold working reamer includes a cylindrical body 30 with a forward end to be inserted through a hole to be reamed. At the forward end of the cylindrical body 30, two sets of cutting edges 32 and 34, namely, the reamer 32 and the burnisher 34, are formed immediately adjacent to each other. Similarly to the typical reamer as shown in FIG. 2, each of the cutting edges 32 and 34 is ground at a slight angle with a slight undercut below the cutting edge 32 or 34. Apart from the straight parallel arrangement as shown, the reamer 32 and burnisher 34 may also include helical cutting edges. As shown in the cross sectional views in FIG. 3, the cutting edges 32 are formed with a counterclockwise orientation about the axis of the cylindrical body 30, while the cutting edges 34 are formed with a clockwise orientation about the axis of the cylindrical body 30. Therefore, the burnisher 34 is in the form of a reverse reamer 32.

Figure 1:
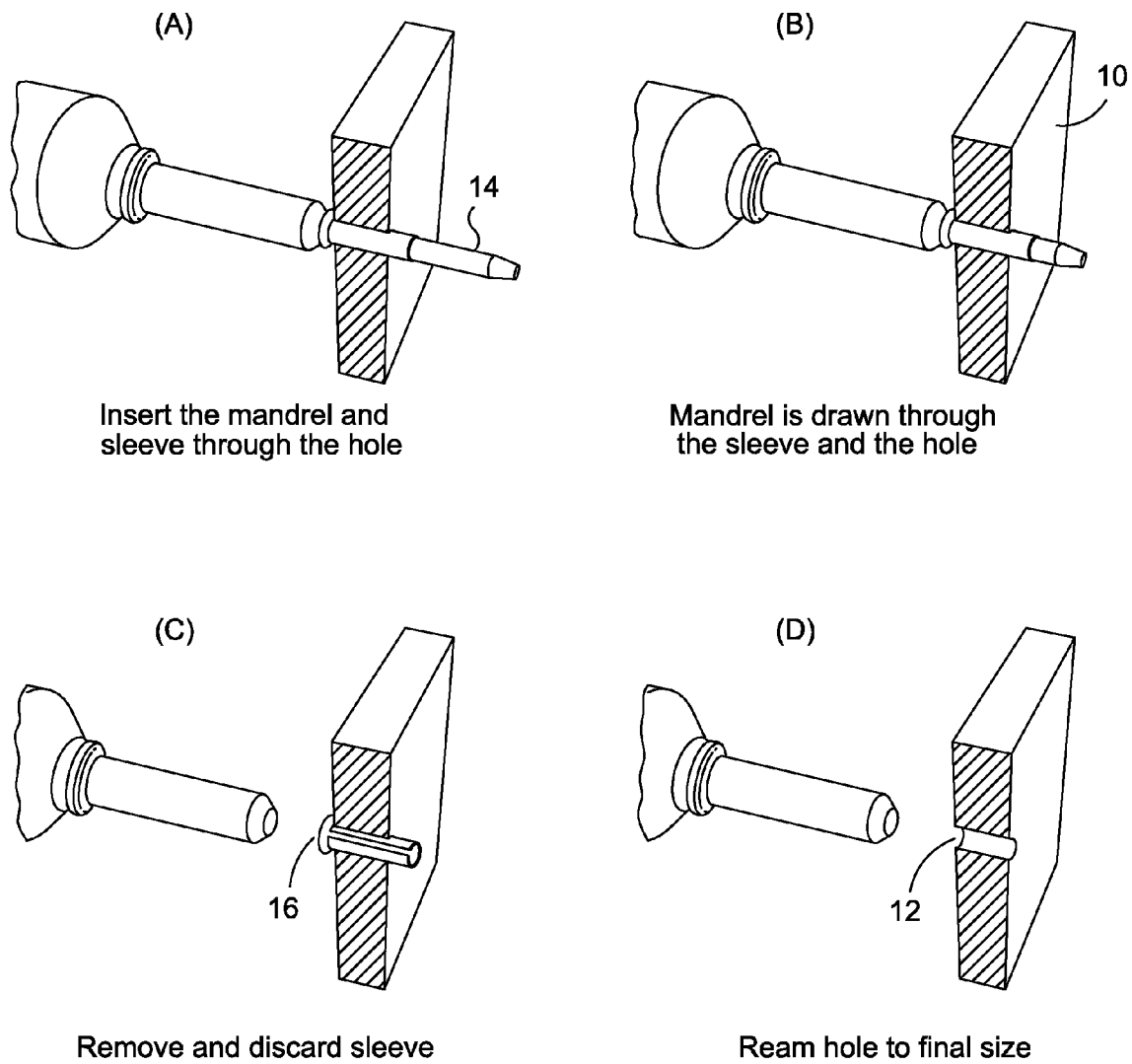
FIG. 1A-1D shows a prior art cold work process.

In application, the cold working reamer as shown in FIG. 3 is attached to a fixed or portable motor. The motor is then operated to spin the cold working reamer through a previously drilled hole far enough such that both the reamer 32 and the burnisher 34 engage the hole and retract from the motor sequentially. As a result, an accurately sized hole which has been cold worked in a single step can be obtained. This is significantly simplified from the methods that require multiple steps and specialized tooling and machinery as illustrated in FIG. 1.

In the embodiment as shown in FIG. 3, the forward end of the cylindrical body 30 is preferably tapered such that the reamer 32 has a cross sectional slightly smaller than that of the burnisher 34. When the reamer 32 is first to engage the hole and removes a relatively small amount of the material leaving the hole with an accurately sized diameter and with a round cross section that is not distorted or oval as can be in the case with twist drills. As the cylindrical body 30 is advanced the slightly larger burnisher 34 engages the hole. The burnisher 34 does not remove material as it is made up of blunt wiping flutes that apply a localized force through the hole to upset the material and which are then rotated around the bore as it spins to result in a uniform residual stress.

Figure 4:
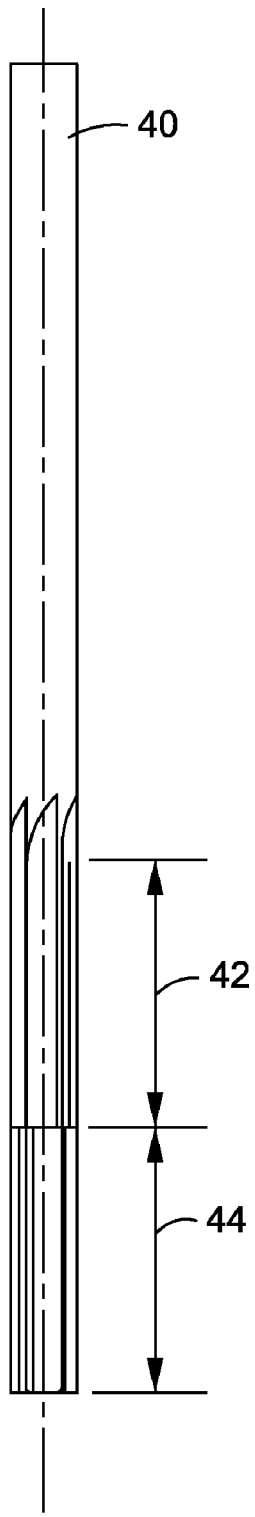
FIG. 4 shows a modification of the cold working reamer as shown in FIG. 3.

FIG. 4 shows a modification of the cold working reamer as shown in FIG. 3. As shown, the cold working reamer also includes two sets of adjacent cutting edges 42 and 44 extending along the axis of the cylindrical body 40 at a forward end thereof. In this embodiment, the burnisher, that is, the cutting edges 44 extending from the tip of the forward end of the cylindrical body 40 to engage a drilled hole first. Similar to the embodiment as shown in FIG. 3, the forward end of the cylindrical body 40 is preferably tapered, such that the burnisher 44 has a cross section slightly larger than that of the reamer 42. When the burnisher 44 engages the hole, the material around the hole is upset by the burnisher 44 and a beneficial residual stress is resulted in. As the cylindrical body 40 advances further, the slightly larger reamer 42 engage the hole to remove some material around the hole while leaves the cold worked material in the hole.

Figure 5:
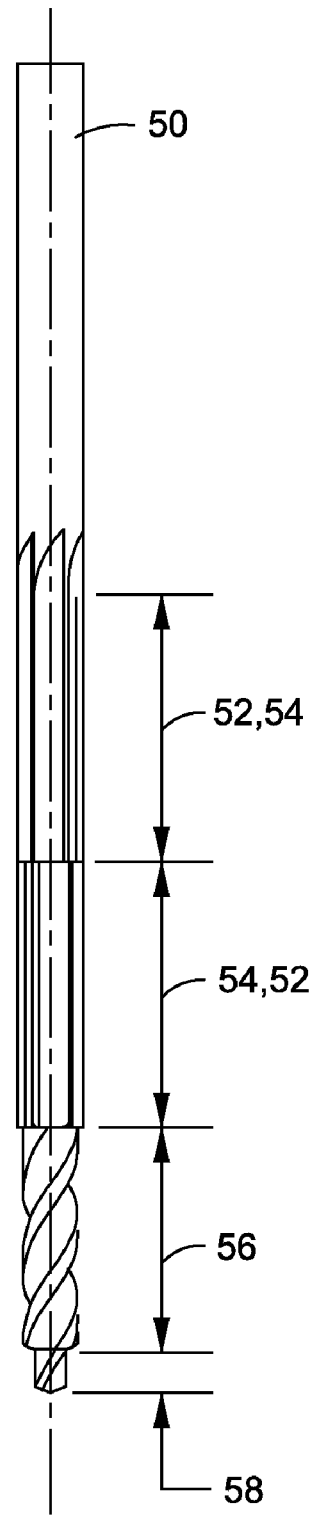
FIG. 5 shows a hole-drilling bit equipped with the cold working reamer as shown in FIG. 3.

In the embodiment as shown in FIG. 5, the cold working reamer is combined with a drill to drill, such that a hole can be drilled, reamed and cold worked by a single tool in a single step. As shown, the cold working, reaming, and drilling tool includes a cylindrical body 50, a coaxial drill 56 extending from the forward tip of the cylindrical body 50, a reamer 52 adjacent to the drill 56 and extending about the axis of the cylindrical body 50, and a burnisher 54 adjacent to the reamer 52 and extending about the axis of the cylindrical body 50. The coaxial drill 56 further comprises a central drill member 48 extending from the tip of the drill 56. The reamer 52 and the burnisher 54 are in the forms of two sets cutting edges with reversed orientations. By spinning the cold working, reaming, and drilling tool as shown in FIG. 5 towards a material, a hole is first drilled through the material by the drill 56. An additional amount of the material around the hole is removed as the tool advances further to engage the reamer 52 with the hole. After the reaming process, the further advancement of the tool allows the burnisher 54 engaging the hole, so as to upset the material around the hole to result in beneficial residual stress. Preferably, the cross sectional area of the drill 56 is slightly smaller than that of the reamer 52, and the cross sectional area of the burnisher 54 is slightly larger than that of the reamer 52.

Similar to the embodiments as shown in FIG. 4, the positions of the reamer 52 and the bunisher 54 can be interchanged such that the cold work can be applied to the hole prior to the reaming process. When the burnisher 54 engages the hole first to upset the material and to leave a beneficial residual stress, the slightly larger reamer 52, while removing some material around the hole, stills leaves the cold worked material in the hole.

The above description is given by way of example, and not limitation. Given the above disclosure, one skilled in the art could devise variations that are within the scope and spirit of the invention disclosed herein, including various configurations and arrangements of cutting edges of the reamer and burnisher. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A cold working reamer, comprising:
   an elongate body having a forward end portion to advance through a hole; and
   a first set and a second set of cutting edges formed on a circumference of the forward end portion of the elongate body, the second set of cutting edges extending from a tip of the forward end to first upset the material around the hole operative to cause beneficial residual stress thereon.

2. The cold working reamer of claim 1, wherein the first and second sets of cutting edges are adjacent to each other.

3. The cold working reamer of claim 1, wherein the forward end of the elongate body is tapered such that the second set of cutting edges has a cross sectional area slightly larger than that of the first set of cutting edges.

4. The cold working reamer of claim 1, wherein the first and second cutting edges have opposite orientation about the elongate body.

5. The cold working reamer of claim 1, wherein the cutting edges include a plurality of parallel straight cutting edges.

6. The cold working reamer of claim 1, wherein the cutting edges include a plurality of helical cutting edges.

7. The cold working reamer of claim 1, wherein the elongate body includes a cylindrical body.

8. The cold working reamer of claim 1, wherein the forward end of the elongate body is tapered such that the first set of cutting edges has a cross sectional area slightly larger than that of the second set of cutting edges.

9. A cold working reamer, comprising:

a cylindrical body having a forward end with a tip to engage a hole drilled through a material;

a burnisher extending from the tip of the forward end to first upset the material around the hole; and a reamer formed on the cylindrical body adjacent to the burnisher to remove an additional amount of the material from the hole.

10. The cold working reamer of claim 9, wherein the first set of cutting edges and the second set of cutting edges are arranged in reverse orientation to each other.

11. The cold working reamer of claim 9, wherein the burnisher has a cross sectional area slightly smaller than that of the reamer.

12. The cold working reamer of claim 9, wherein the reamer includes a plurality of first cutting edges operative to remove additional material around the hole.

13. The cold working reamer of claim 9, wherein the burnisher includes a plurality of second cutting edges operative to first upset the material around the hole to result in beneficial residual stress thereon.

* * * * *